(12) United States Patent
Dossche et al.

(10) Patent No.: US 8,541,085 B2
(45) Date of Patent: Sep. 24, 2013

(54) BAMBOO COMPOSITE BOARD AND BEAM PRODUCT

(75) Inventors: Piet V. Dossche, Rocky Face, GA (US); Philippe Erramuzpe, Augusta, GA (US)

(73) Assignee: US Floors, Inc., Dalton, GA (US)

( * ) Notice: Subject to any disclaimer, the term of this patent is extended or adjusted under 35 U.S.C. 154(b) by 622 days.

(21) Appl. No.: 12/583,245

(22) Filed: Aug. 18, 2009

(65) Prior Publication Data

US 2011/0045243 A1 Feb. 24, 2011

(51) Int. Cl.
- *B32B 3/00* (2006.01)
- *B32B 5/00* (2006.01)
- *B32B 37/12* (2006.01)
- *B32B 38/00* (2006.01)

(52) U.S. Cl.
USPC ............... 428/54; 428/55; 428/58; 428/301.4

(58) Field of Classification Search
USPC ...................... 428/54, 58, 301.4, 55
See application file for complete search history.

(56) References Cited

U.S. PATENT DOCUMENTS

| 4,061,819 | A | | 12/1977 | Barnes |
| 5,543,197 | A | | 8/1996 | Plaehn |
| 2009/0271931 | A1 | | 11/2009 | Yee |
| 2011/0027529 | A1 | | 2/2011 | Zhang |

FOREIGN PATENT DOCUMENTS

| JP | 2006-68496 A | * | 3/2006 |
| KR | 2002036066 A | * | 5/2002 |

OTHER PUBLICATIONS

Translation of JP-2006-68496-A (Kawahara), Mar. 2006.*
Translation of KR-2002036066-A (Cho), May 2002.*

* cited by examiner

*Primary Examiner* — Brent O'Hern
(74) *Attorney, Agent, or Firm* — Miller & Martin PLLC (57) ABSTRACT

New engineered wood products are provided by adding adhesives to alternating layers of bamboo and cork or other lignocellulostic or recycled materials and varied appearances are attained through the use of stains and the vertical or horizontal cuts applied to the products.

20 Claims, 7 Drawing Sheets
(6 of 7 Drawing Sheet(s) Filed in Color)

200
BAMBOO COMPOSITE BOARD AND BEAM PRODUCT

FIELD OF THE INVENTION

This invention relates to the use of bamboo and cork or other materials to bond or fuse a composite structure having novel appearance and usable for structural members such as beams and dimensional lumber, as well as for boards, panels, flooring and veneers.

BACKGROUND OF THE INVENTION

Traditionally, wood beams and other wood products have been cut from naturally grown trees. However, trees are limited in supply due to the years necessary for the trees to reach maturity, and particularly hardwood trees most suitable for lumber products. Also, the extensive harvesting of hardwood trees aggravates the increases in greenhouse gases such as carbon-dioxide and should be conducted on a managed basis.

One approach to this problem has been to produce composite lumber products formed out of wood scraps, inferior quality lumber materials, and even sawdust. Such processes generally utilize steps where wood pieces are coated with an adhesive and subjected to compression and heat to form a pressed composite assembly. This technique has been utilized to manufacture particleboard from small wood particles and to manufacture plywood from wood veneer sheets.

One process that has been developed is adapted to manufacturing structural wood products from long, relatively thin strands of wood, and involves coating the strands with adhesive, arranging the strands side-by-side in a length-wise dimension of the lumber product and subjecting the arranged strands to heat and compression. Using this technique, high strength dimensional wood products can be formed as reflected in U.S. Pat. No. 4,061,819. Similar products are disclosed as being manufactured from bamboo segments in U.S. Pat. No. 5,543,197.

The use of bamboo in lumber products is of particular interest due to environmental concerns. Bamboo is recognized as an environmentally friendly, sustainable and renewable resource. The pole of the bamboo plant typically grows rapidly and reaches full maturity in only 4-7 years. If the bamboo pole is not harvested, the pole dies and a new pole regenerates from the base of the original plant. For this reason harvesting the bamboo pole causes no harm or reduction in the growth of the bamboo plant or its absorption of carbon dioxide through growth. Factories manufacturing bamboo lumber products have traditionally been located in Asia near the bamboo plantations and forests, to minimize transportation costs of raw materials.

By moving away from the commodity types of limited color pallet bamboo product offerings in three foot lengths that have been produced in a traditional manner by simply gluing or pressing bamboo strips together, oriented strand or strand woven bamboo products have developed increasing popularity. Strand woven bamboo, produced through the use of adhesives and pressure, can be manufactured into extremely hard and durable products resulting in flooring that can be used for high traffic areas and that can be nailed, glued down, and floated and isolated from a subfloor to prevent contact with moisture. To this time, these engineered strand-woven bamboo products have been manufactured with limited variations in appearance, particularly by cutting the exposed surfaces to show either flat grain or vertical grain orientation. The market desires additional and more varied appearances from flooring products. In order to provide these appearances, some bamboo surfaces have been hand scraped, distressed or otherwise treated to create rustic effects, and stains have been applied to broaden the color pallet of strand woven bamboo products beyond the natural and caramelized colors traditionally offered for bamboo.

Another flooring material that is recognized as environmentally friendly is cork. Cork is harvested from the bark of oak trees in the Mediterranean, and primarily in Portugal. The bark is gently peeled from the trees every 7-10 years and the trees are not cut down or harmed in any way as they regenerate their bark over time. Some evidence suggests that harvested trees are more vigorous and have higher carbon dioxide absorption rates than trees left in their natural state. Much of the desirability of cork as a flooring or surface option is attestable to benefits provided in the areas of maintenance, insulation, resilience, impermeability and flame retardance. Cork's cellular structure provides a high resistance to liquid penetration, and 90% of cork's tissue is gaseous matter that makes for excellent thermal and acoustical installation. The cellular gas structure also allows a cork floor to recover quickly from pressure and provides a comfortable surface for walking and standing.

SUMMARY OF THE INVENTION

An object of the invention is to provide a structural, flooring and paneling product having a desirable appearance made in an environmentally responsible manner.

In one aspect of the invention, a strand woven bamboo manufacturing process is utilized with alternating layers of bamboo and cork. Cork has not heretofore been combined with bamboo in this manufacturing process. One reason that could explain the absence of this combination is simply the lack of proximity between bamboo and cork growing regions. An additional reason that cork has not been utilized in a strand woven bamboo manufacturing process is that the extreme pressures would have been thought to negate the advantages of the cork as a flooring and surface material that derive from the gaseous content of cork.

In accordance with the invention, layers of bamboo may be placed in the pressurizing equipment in thicknesses between about 5 millimeters to about 50 millimeters in depth with alternating layers of cork having a thickness of between about 1 up to about 6 millimeters. The layers of cork may be made of compressed cork sheets or granules. The alternating layers are advantageously stacked to a depth of between about 35 to 130 centimeters and combined with adhesives and subjected to pressure.

Stain may also be added to the product, as has been done with the strand-woven bamboo in the past. However, due to differences in cork and bamboo, the stains are absorbed differently, typically, with the cork having a greater absorbency, resulting in a darker appearance than the bamboo.

The resulting lumber products can be utilized as conventional lumber for structural support or maybe cut and sliced into flooring or veneers. In particular, slicing to show vertical grain results in an unusual appearance while slicing horizontally to show horizontal grain typically slices through only a few layers of bamboo and cork and results in an appearance more akin to traditional horizontal grain cuts of pine, cedar or other conventional softwoods.

In other aspects of the invention, materials other than cork may be utilized in alternating layers with bamboo and wood such as oak or other hardwoods, are considered to be particularly desirable in this regard. A variety of exotic wood species including eucalyptus, acacia, birch, palm wood, rubber wood, and mulberry wood can be employed in the alternating layers.

For maximum prological impact, properly processed recycled materials including rubber, glass, linoleum, vinyl and leather or renewable and sustainable products such as FSC (Forest Stewardship Council) certified wood species, and natural fiber material such as coir, jute, seagrass and straw may be suitable.

A BRIEF DESCRIPTION OF THE DRAWINGS

The patent or application file contains at least one drawing executed in color. Copies of this patent or patent application publication with color drawing(s) will be provide by the Office upon request and payment of the necessary fee.

The invention is further described by way of example only with reference to the accompanying drawings in which.

DETAILED DESCRIPTION OF THE INVENTION

Figure 1:
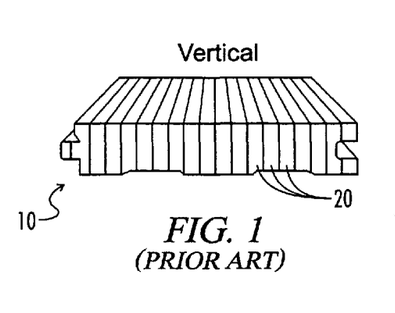
FIG. 1 is a graphic illustration of a prior art vertical grain bamboo lumber product.
Figure 2:
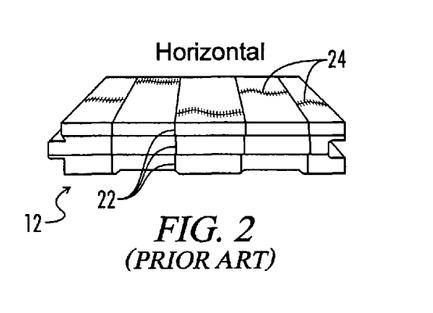
FIG. 2 is a graphic illustration of a prior art horizontal grain bamboo product.
Figure 3:
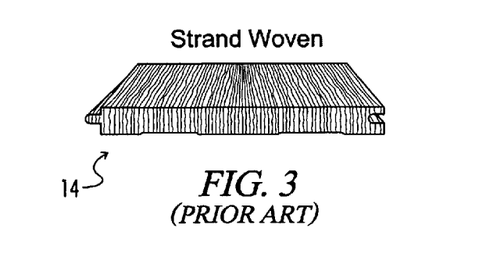
FIG. 3 is a graphic illustration of a prior art strand-woven bamboo product.

Among the prior art forms of bamboo flooring, the vertical and horizontal grain flooring, shown in FIGS. 1 and 2 respectively, have been known for many years. In the vertical grain bamboo flooring FIG. 1, bamboo strips 20 are oriented on edge and then pressed and glued together to form flooring 10 or paneling, veneers, and other wood products. The bamboo strips 20 in the horizontal grain bamboo of FIG. 2 feature the traditional distinctive knuckle 24 characteristic that visually repeats on the surface of the board 12, or paneling, veneers or other products.

More recently, strand woven bamboo products have become available manufactured in a similar fashion to oriented strand board, but adapted for particular characteristics of bamboo. Specifically, the bamboo is harvested and cut into strips, washed, dried, mixed with resin binders and wax, laid in position, then pressed, typically under both heat and pressure, cooled, finished, as with aluminum oxide finish for flooring, and cut to size.

Figure 6:
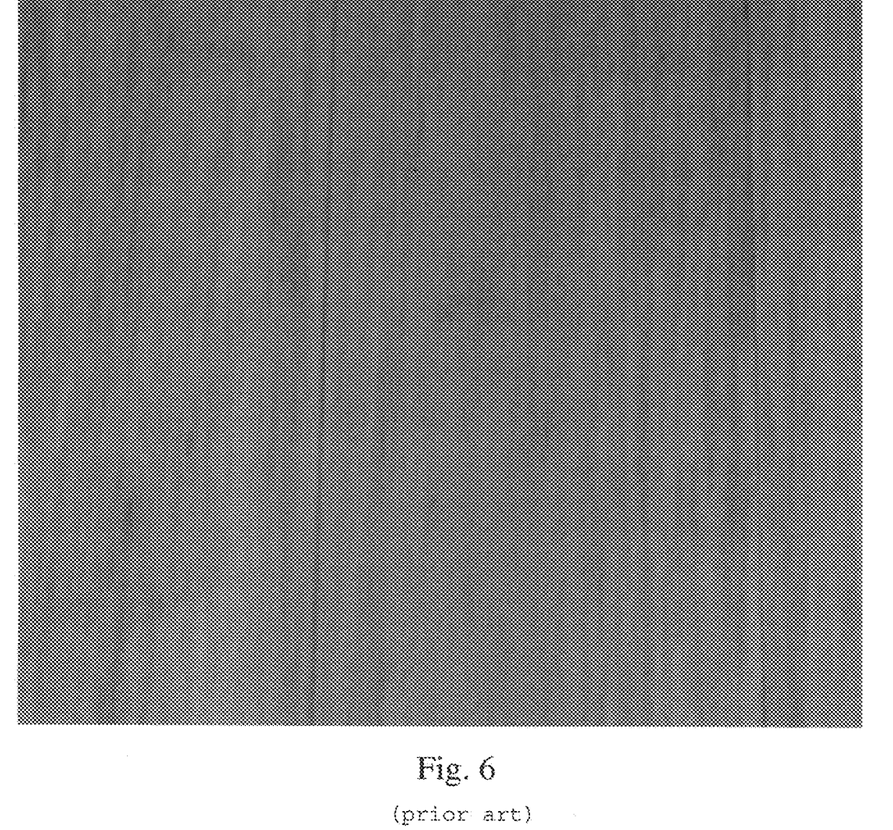
FIG. 6 is a photograph of an unstained horizontal grain strand woven bamboo product.
Figure 7:
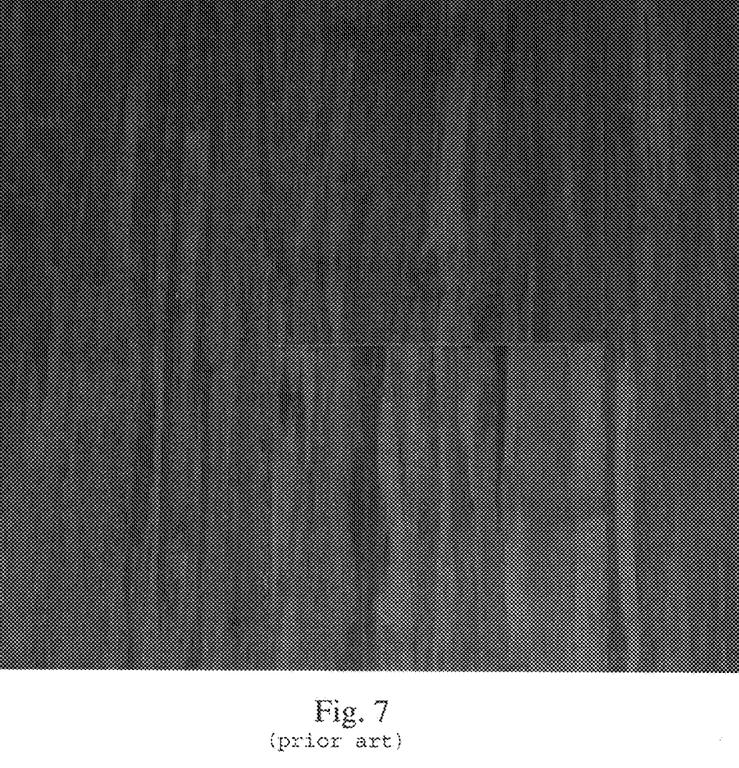
FIG. 7 is a photograph of a caramelized horizontal grain strand woven bamboo product.
Figure 8:
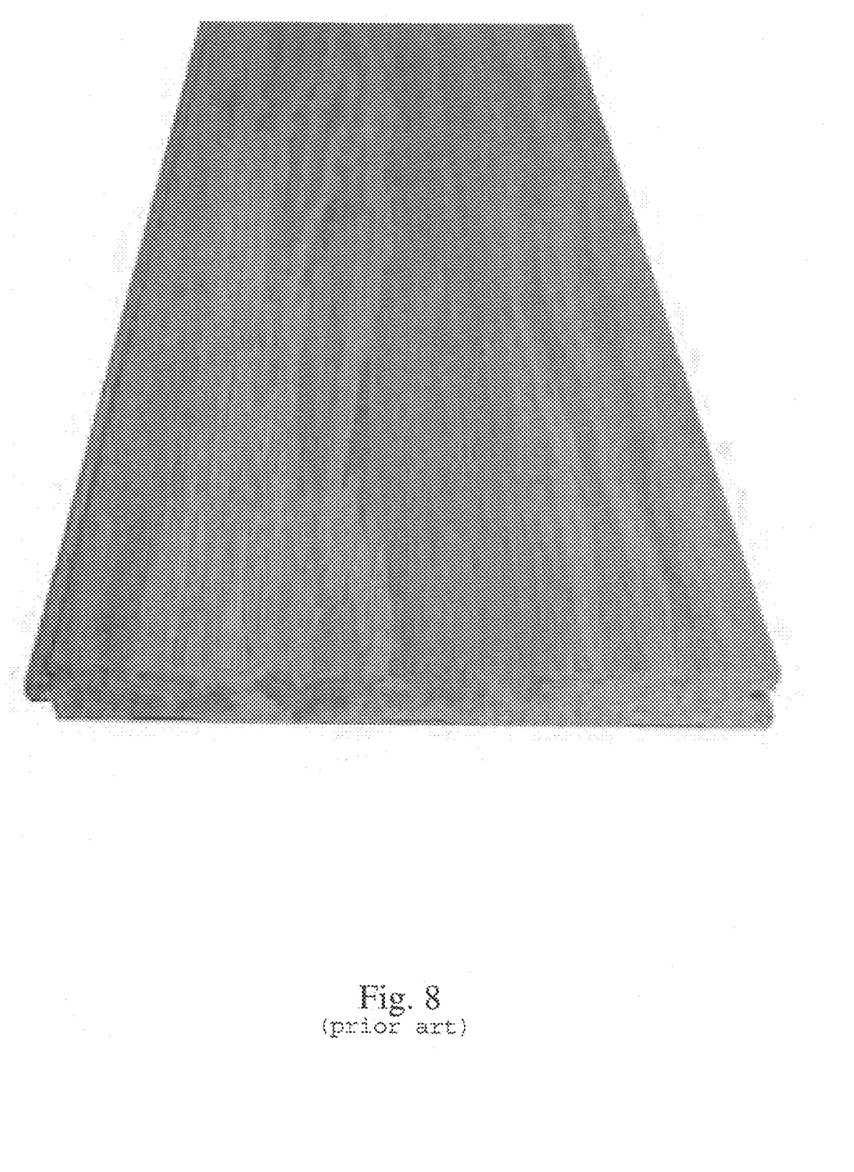
FIG. 8 is a photograph of an unstained vertical grain strand woven bamboo product.
Figure 9:
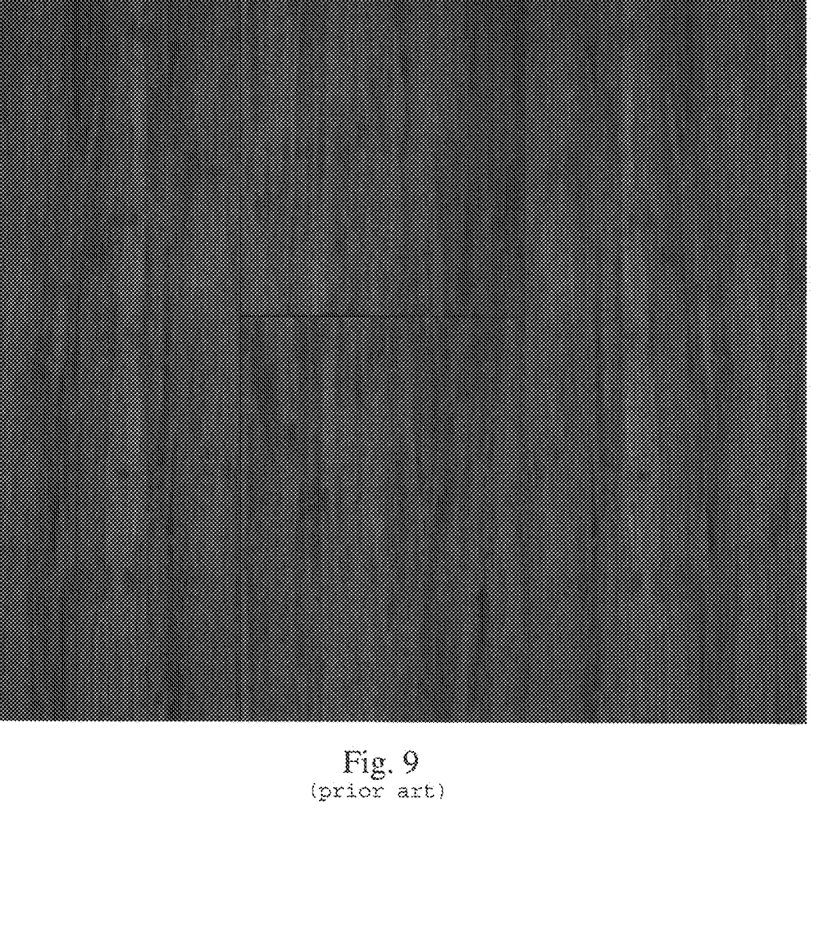
FIG. 9 is a photograph of a caramelized vertical strand woven bamboo product.

The resin systems are often phenolic resins that are thermosetting and may be mixed with isocynate binders, or isocynate binders may be used alone. Waxes, typically referred to as slack waxes or wax emulsions are also added in a small amount. The resulting strand woven board 14 has a much less regular grain pattern than either conventional lumber products or the more traditional vertical or horizontal bamboo products. The lack of regular grain can be seen in the photographs of FIGS. 6 and 7 for unstained and caramelized horizontal grain strand woven bamboo products and in FIGS. 8 and 9 for vertical strand woven bamboo products.

Accordingly, according to the invention layers of bamboo are alternated with another material, most preferably cork, when components are assembled after coating with the binder system and waxes for pressing. Generally, the press will operate with a stack of materials up to about 1 or 1.5 meters in height and these materials will preferably be formed in layers of bamboo strips that have been cleaned and treated with a binder system and wax in layers of about 5-50 millimeters alternated with another material. One particularly desirable material is cork that may be utilized in a layer between about 1-6 millimeters in depth. The alternating layers of bamboo strips and cork are then repeated until desired height to be submitted to the press as reached. The layered material then subjected to pressure and heat and is sliced in either a vertical or horizontal fashion.

One preferred manufacturing method involves stacking layers of bamboo segments coated with adhesive resin to a thickness between 6 and 50 millimeters with alternating layers of lignocellulostic material or recycled material coated with adhesive resin to a thickness of between 1 and 6 millimeters, compressing the layers of lignocellulostic or recycled material and bamboo segments and heating the adhesive resin and curing the resulting layered product. The recycled material can be rubber, glass, linoleum, vinyl or leather and the lignocellulostic material cork, oak, hardwood, eucalyptus, acacia, birch, palm wood, rubber wood, mulberry wood, FSC certified wood species, coir, jute, seagrass or straw, but cork granules or sheets are of particular interest. Stain may also be applied to the bamboo segments and lignocellulostic or recycled materials before compressing the layers.

Figure 4:
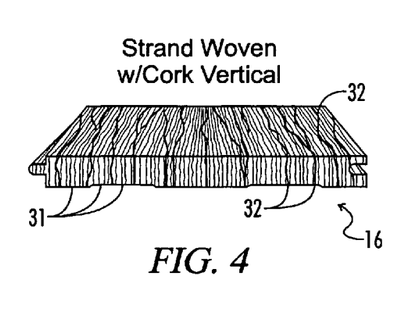
FIG. 4 is a graphic illustration of a vertical grain cork and bamboo product.
Figure 11:
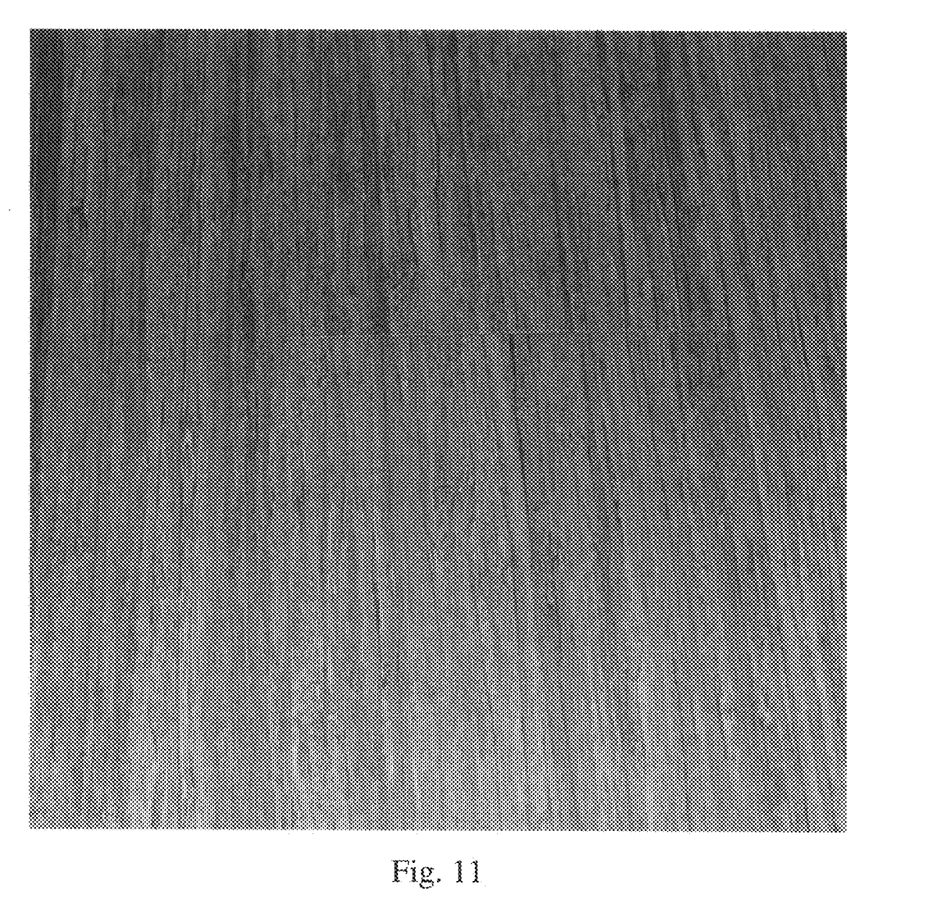
FIG. 11 is a color photograph of a vertical grain bamboo and cork layered product.

When sliced in a vertical fashion, the layers of cork 32 between the layers of bamboo 31 as shown in FIG. 4 appear as distinct lines on the face of the strand woven panel 16. As shown in the photograph of FIG. 11, this is a distinct appearance from prior art vertical strand woven bamboo products shown in FIGS. 8 and 9.

Figure 5:
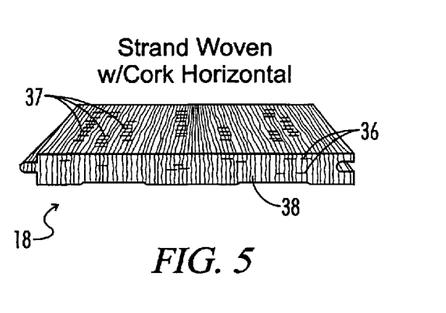
FIG. 5 is a graphic illustration of a horizontal grain cork and bamboo product.
Figure 10:
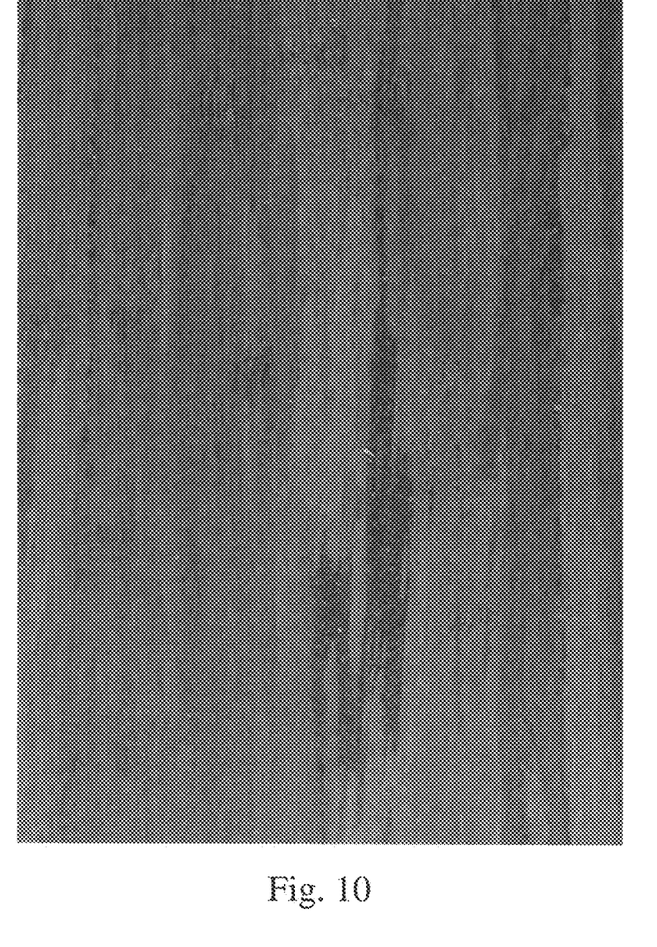
FIG. 10 is a color photograph of a stained horizontal grain bamboo and cork layered product.

In contrast, as illustrated in FIG. 5, when the bamboo and cork layered strand woven product 18 is cut horizontally, broader sections 37 of the cork material are displayed on a strand woven bamboo 38 background and cross-sections 36 of the cork material at the end view. One example of such material is shown in the photograph of FIG. 10, and the shapes of the cork or other material that are displayed in contrast to the strand woven bamboo may be presented in a wide variety of fashions. The novel appearance of the panel of FIG. 10 is in contrast to prior art horizontal strand woven bamboo shown in FIGS. 6 and 7.

Instead of utilizing cork, other materials to produce a contrast with strand woven bamboo may be advantageously employed. Oak or other hardwoods may be particularly desirable. In some cases, exotic wood species or wood such as eucalyptus, acacia, birch, palm wood, rubber wood or mulberry wood may be employed in the alternating layers. For favorable ecological impact, properly processed recycled materials, including, rubber, glass, linoleum, vinyl, and leather, or sustainable products such as FSC certified wood species, and natural fiber materials such as coir, jute, seagrass, and straw may be used. It will be understood that the depth of the layers of the alternating material can be adjusted according to the density of that material to produce the desired visual appearance in the finished wood products.

All publications, patent, and patent documents mentioned herein are incorporated by reference herein as though individually incorporated by reference. Although preferred embodiments of the present invention have been disclosed in detail herein, it will be understood that various substitutions and modifications may be made to the disclosed embodiment described herein without departing from the scope and spirit of the present invention as recited in the appended claims.

We claim:

1. An engineered wood product having alternating layers of strand woven bamboo formed from bamboo and adhesive resin cured under pressure and layers of cork and adhesive resin cured under pressure.

2. The engineered wood product of claim 1 wherein the layers of cork are comprised of sheets of cork.

3. The engineered wood product of claim 1 wherein the layers of cork are comprised of cork granules.

4. The engineered wood product of claim 1 further comprising a stain.

5. An engineered wood product having alternating layers of strand woven bamboo and cork in the form of a flooring product cut to display vertical grain.

6. An engineered wood product having alternating layers of strand woven bamboo and cork in the form of a flooring product cut to display horizontal grain.

7. An engineered wood product having alternating layers of strand woven bamboo and another material selected from the group of lignocellulostic material and recycled materials wherein the recycled material is selected from the group of rubber, glass, linoleum, vinyl and leather.

8. An engineered wood product having alternating layers of strand woven bamboo and another material selected from the group of lignocellulostic material and recycled materials in the form of a flooring product cut to display vertical grain.

9. An engineered wood product having alternating layers of strand woven bamboo and another material selected from the group of lignocellulostic material and recycled materials in the form of a flooring product cut to display horizontal grain.

10. An engineered wood flooring product formed of layers of bamboo segments coated with adhesive resin with alternating layers of lignocellulostic material or recycled material coated with adhesive resin, wherein the layers of bamboo segments have an original thickness between 6 and 50 millimeters and the layers of lignocellulostic material or recycled material have an original thickness of between 1 and 6 millimeters prior to compressing the layers of lignocellulostic or recycled material and bamboo segments and heating the adhesive resin and curing the resulting layered product.

11. The engineered wood flooring product of claim 10 wherein the recycled material is selected from the group of rubber, glass, linoleum, vinyl and leather.

12. The engineered wood flooring product of claim 10 wherein the lignocellulostic material is selected from the group of cork, oak, hardwood, eucalyptus, acacia, birch, palm wood, rubber wood, mulberry wood, Forest Stewardship Council certified wood species, coir, jute, seagrass and straw.

13. The engineered wood flooring product of claim 10 wherein the layers of lignocellulostic materials are comprised of sheets of cork.

14. The engineered wood flooring product of claim 10 wherein the layers of lignocellulostic materials are comprised of cork granules.

15. The engineered wood flooring product of claim 10 wherein a stain is applied to the bamboo segments and lignocellulostic or recycled materials before compressing the layers.

16. The engineered wood flooring product of claim 15 wherein the lignocellulostic materials are cork which has a different absorbency of the stain relative to the bamboo segments resulting in a relatively lighter appearance of the bamboo segments.

17. The engineered wood flooring product of claim 10 wherein the resulting layered product is cut to display vertical grain.

18. The engineered wood flooring product of claim 10 wherein the resulting layers product is cut to display flat grain.

19. An engineered wood product in a form selected from the group of beams, dimensional lumber, boards, panels or veneers, said product comprising alternating layers of strand woven bamboo comprising bamboo segments and adhesive resin, and layers of another material selected from the group of lignocellulosic materials and recycled materials with adhesive resin.

20. The engineered wood product of claim 19 wherein the lignocellulostic material is selected from the group of cork, oak, hardwood, eucalyptus, acacia, birch, palm wood, rubber wood, mulberry wood, Forest Stewardship Council certified wood species, coir, jute, seagrass and straw.

\* \* \* \* \*